United States Patent
Wilding

(10) Patent No.: US 10,409,701 B2
(45) Date of Patent: Sep. 10, 2019

(54) PER-STATEMENT MONITORING IN A DATABASE ENVIRONMENT

(71) Applicant: salesforce.com, inc, San Francisco, CA (US)

(72) Inventor: Mark Wilding, Issaquah, WA (US)

(73) Assignee: salesforce.com, inc., San Francisco, CA (US)

( * ) Notice: Subject to any disclaimer, the term of this patent is extended or adjusted under 35 U.S.C. 154(b) by 278 days.

(21) Appl. No.: 15/234,783

(22) Filed: Aug. 11, 2016

(65) Prior Publication Data

US 2018/0046678 A1 Feb. 15, 2018

(51) Int. Cl.
*G06F 11/30* (2006.01)
*G06F 16/2453* (2019.01)

(52) U.S. Cl.
CPC .......... *G06F 11/30* (2013.01); *G06F 16/2453* (2019.01)

(58) Field of Classification Search
CPC ......... G06F 17/30528; G06F 17/30404; G06F 11/30; G06F 16/2453
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |

(Continued)

OTHER PUBLICATIONS

Non-Final Office Action for U.S. Appl. No. 15/234,753 dated Sep. 17, 2018, 15 pages.

(Continued)

*Primary Examiner* — Kris E Mackes
*Assistant Examiner* — Tiffany Thuy Bui
(74) *Attorney, Agent, or Firm* — Jaffery, Watson, Mendonsa & Hamilton, LLP

(57) ABSTRACT

One or more client threads are executed. One or more processing threads corresponding to the one or more client threads are executed. The processing threads are configurable to generate statistical information for each database query statement processed by the corresponding client thread. The statistical information is generated from the processing threads. The statistical information is stored in chunks of memory managed via a plurality of queues. The chunks of memory containing the statistics are analyzed. Outlier statements are filtered based on the statistics. Non-outlier statements are stored by a storage device.

20 Claims, 10 Drawing Sheets

(56) References Cited

U.S. PATENT DOCUMENTS

| | | | |
|---|---|---|---|
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshaysky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,289,976 B2 | 10/2007 | Kihneman et al. | |
| 7,340,411 B2 | 3/2008 | Cook | |
| 7,558,796 B1 | 7/2009 | Bromwich et al. | |
| 7,620,655 B2 | 11/2009 | Larsson et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0059997 A1 | 3/2004 | Allen et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0138015 A1* | 6/2005 | Dageville | G06F 17/30306 |
| 2006/0031189 A1* | 2/2006 | Muras | G06F 17/30433 |
| 2006/0136396 A1 | 6/2006 | Brobst | |
| 2006/0294058 A1* | 12/2006 | Zabback | G06F 17/30306 |
| 2007/0169055 A1* | 7/2007 | Greifeneder | G06F 11/3476 717/158 |
| 2008/0319959 A1* | 12/2008 | Bireley | G06F 8/447 |
| 2009/0106219 A1* | 4/2009 | Belknap | G06F 17/30469 |
| 2009/0177744 A1 | 7/2009 | Marlow et al. | |
| 2009/0182724 A1* | 7/2009 | Day | G06F 17/30442 |
| 2009/0248618 A1* | 10/2009 | Carlson | G06F 17/30445 |
| 2010/0082517 A1 | 4/2010 | Lawrence et al. | |
| 2010/0095299 A1 | 4/2010 | Gupta et al. | |
| 2010/0312776 A1* | 12/2010 | Burrichter | G06F 17/30395 707/759 |
| 2010/0325124 A1* | 12/2010 | Wu | G06F 17/30306 707/759 |
| 2011/0055198 A1* | 3/2011 | Mitchell | G06F 17/30404 707/713 |
| 2011/0320435 A1* | 12/2011 | Collins | G06F 17/30442 707/718 |
| 2012/0240185 A1 | 9/2012 | Kapoor et al. | |
| 2014/0310249 A1* | 10/2014 | Kowalski | G06F 17/30289 707/688 |
| 2015/0100566 A1* | 4/2015 | Ramaswami | G06F 17/30463 707/718 |
| 2015/0163242 A1 | 6/2015 | Laidlaw et al. | |
| 2016/0232206 A1 | 8/2016 | Hayamizu et al. | |
| 2016/0364486 A1 | 12/2016 | Mall et al. | |
| 2017/0147834 A1* | 5/2017 | Bendersky | G06F 17/30477 |

OTHER PUBLICATIONS

Final Office Action for U.S. Appl. No. 15/234,753, dated Apr. 18, 2019, 15 pages.

* cited by examiner

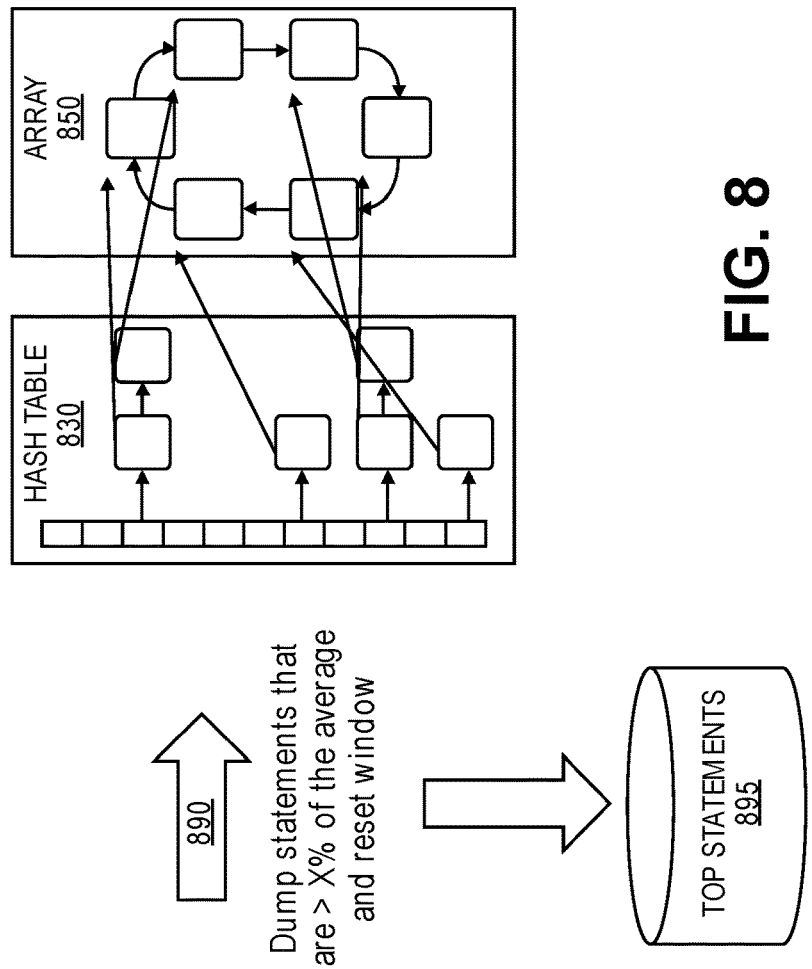
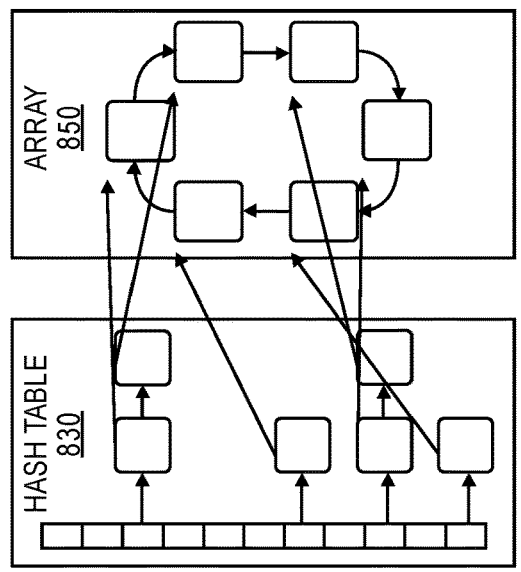
FIG. 8

PER-STATEMENT MONITORING IN A DATABASE ENVIRONMENT

TECHNICAL FIELD

Embodiments relate to techniques for monitoring database statements. More particularly, embodiments relate to techniques for monitoring database statements to identify outlier statements.

BACKGROUND

Databases are commonly used to store large amounts of data. As the amount of data managed increases, so too does the overhead required to manage the data. This overhead can include monitoring and statistics gathering and corresponding management. Traditional techniques for these tasks do not scale well to environments that handle very large amounts of data, for example, a multitenant environment having a large number of independent tenants. Thus, know strategies are not suited for providing optimal levels of monitoring information.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 8 is a conceptual diagram of a technique for managing elements in a hash table and an array to collect statistics as described herein where statement statistical values are periodically dumped.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Figure 1:
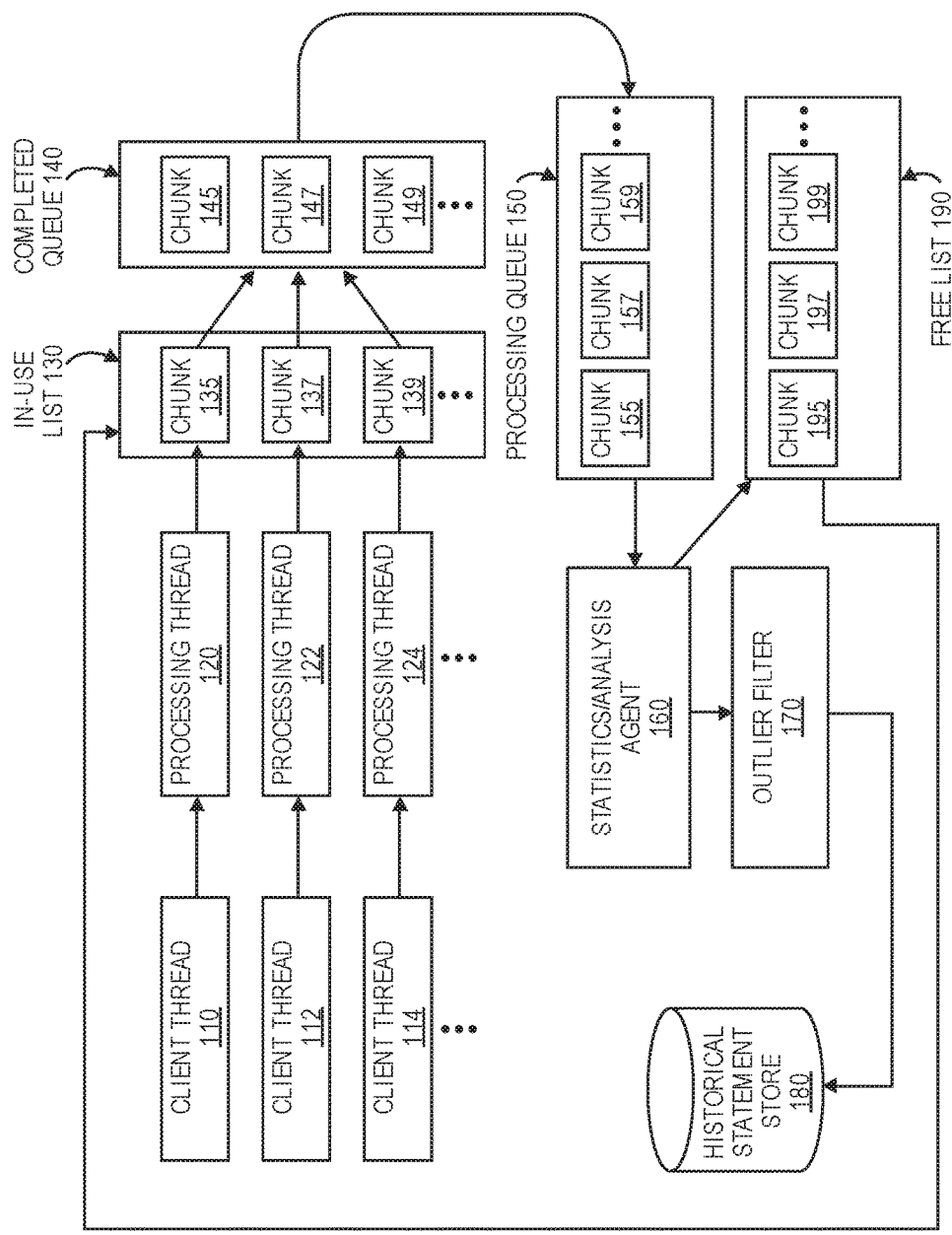
FIG. 1 is a block diagram of one embodiment of a database statement monitoring architecture.

FIG. 1 is a block diagram of one embodiment of a database statement monitoring architecture. In one embodiment, the database statement monitoring architecture utilizes a set of lists (e.g., in-use list 130, free list 190) and queues (e.g., completed queue 140, processing queue 150) to manage chunks of data having statistical information related to one or more database statements. In one embodiment, the database statements are structured query language (SQL) statements; however, other types of database statements can be analyzed in a similar manner. The techniques described herein can also be utilized by an environment operating on input statements and/or events.

The example of FIG. 1 illustrates three clients threads or processes (e.g., 110, 112, 114), which can be threads executed by one or more processors within a computing environment. In one embodiment, the computing environment can be an on-demand services environment, for example, a multitenant computing environment having one or more databases. In one embodiment, each client thread has a corresponding processing thread (e.g., client thread 110→processing thread 120, client thread 112→processing thread 122, client thread 114→processing thread 124). Any number of client threads can be supported. Client threads are client applications that issue SQL statements against a database server. Processing threads execute these SQL statements inside the database engine on behalf of the client threads.

In one embodiment, chunks (e.g., 195, 197, 199) start in free list 190 and are moved to in-use list 130. In one embodiment, chunks are moved from free list 190 to in-use list 130 under latch. In one embodiment, in-use list 130 includes one chunk of memory for each processing thread (e.g., processing thread 120→chunk 135, processing thread 122→chunk 137, processing thread 124→chunk 139) providing statement statistical information. When a chunk in in-use list 130 is full, the full chunk is moved to completed queue 140. Completed queue 140 stores chunks (e.g., 145, 147, 149) that are sufficiently filled with statement statistical information until they can be moved to processing queue 150.

In one embodiment, statistics/analysis agent 160 operates to remove chunks (e.g., 155, 157, 159 . . . ) from processing queue 150 and perform the analysis described herein on and moves chunks from processing queue to free list 190 after the analysis. Chunks from free list 190 can be used by in-use list 130 to replace chunks that have been moved out to completed queue 140.

In one embodiment, outlier filter 170 is coupled with statistics/analysis agent 160 to identify outlier statements by performing the analysis described above to find statements that are a sufficient distance from normal. In one embodiment, the statements identified by outlier filter 170 can be subject to further analysis before operation. In one embodiment, the outlier statements can be stored in historical statement store 180. One of the reasons for this high performance is that it leaves room (e.g., processor resources) for light-weight, real-time analysis even at very high throughput of statement executions per second.

In one embodiment, statement execution can be used to update per-statement statistics directly in a shared memory hosting the chunks described in FIG. 1. In one embodiment, this can be supported via use of a per-statement pointer. In one embodiment, a stack of statement statistics pointers can be utilized to support nested SQL statements. In one embodiment, processing mechanisms are provided that can measure resource utilization including, for example, processor utilization, memory allocation, disk space utilization, network utilization, etc.

Figure 2:
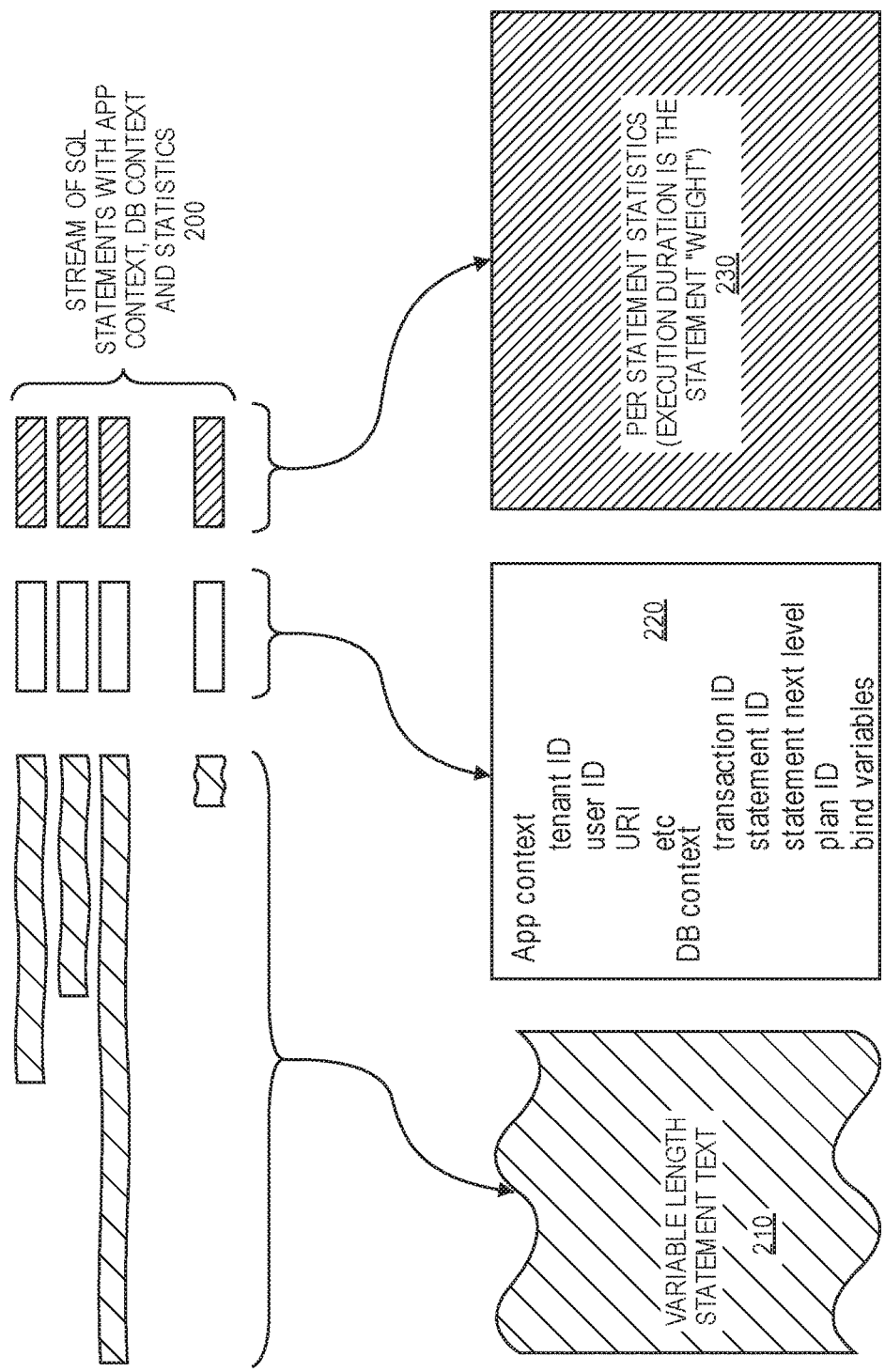
FIG. 2 is a conceptual illustration of a stream of SQL statements that can be monitored to provide per-statement statistical information.

FIG. 2 is a conceptual illustration of a stream of SQL statements that can be monitored to provide per-statement statistical information. In one embodiment, stream of SQL statements 200 can be provided from one or more app servers or other sources of SQL statements. In one embodiment, stream of SQL statements 200 can be received by a database server provided by a hardware computing platform having at least a processor and associated memory running some form of database management software.

Each SQL statement includes at least variable length statement text 210. SQL statements and syntax are known in the art. In one embodiment, each SQL statement also includes app context information and/or database context information 220. App context information can include, for example, a tenant identifier (tenant ID), a user identifier (user ID), a universal resource identifier (URI), etc. Database context information can include, for example, a transaction identifier (transaction ID), a statement identifier (statement ID), a statement nest level, a plan identifier (plan ID), bind variables, etc.

In one embodiment, each SQL statement has associated per-statement statistics 230. In one embodiment, each statistical value has an associated weight that can be calculated from execution of the statement, for example, an execution duration. Per-statement statistics 230 can be utilized as described herein to provide statistics-based monitoring.

Figure 3:
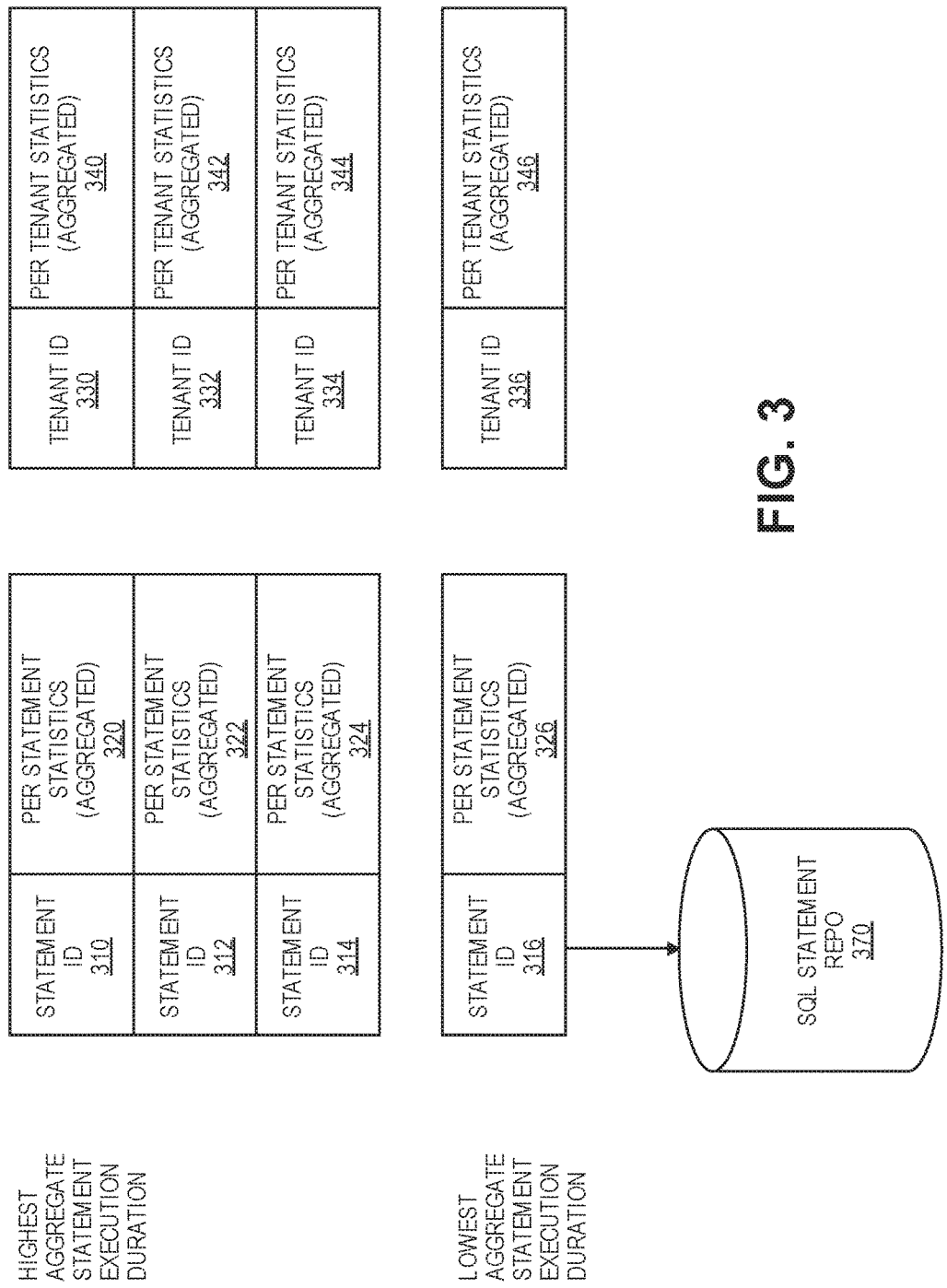
FIG. 3 is a conceptual illustration of a structure to gather aggregated statistics for a stream of SQL statements.

FIG. 3 is a conceptual illustration of a structure to gather aggregated statistics for a stream of SQL statements. In one embodiment, a stream of SQL statements (not illustrated in FIG. 3) can be provided from one or more app servers or other sources of SQL statements (not illustrated in FIG. 3). In one embodiment, the stream of SQL statements can be received by a database server provided by a hardware computing platform having at least a processor and associated memory running some form of database management software. In one embodiment, statistics can be organized by aggregate statement execution time.

In one embodiment, per-statement aggregated statistics (e.g., 320, 322, 324, 326) can be gathered and grouped by statement ID (e.g., 310, 312, 314, 316), which is the identifier for each SQL statement and can be used to associate the aggregated statistics with the corresponding SQL statement. This statistical information can be organized and stored in SQL statement repository 370. In various embodiments, the statement ID or tenant ID can be used as a key for the hash table.

In one embodiment, per-tenant aggregated statistics (e.g., 340, 342, 344, 346) can be gathered and grouped by tenant ID (e.g., 330, 332, 334, 336), which is the identifier for each tenant in a multitenant environment and can be used to associate the aggregated statistics for SQL statements from the tenant with the corresponding tenant ID. This statistical information can be organized and stored in SQL statement repository 370.

Figure 4:
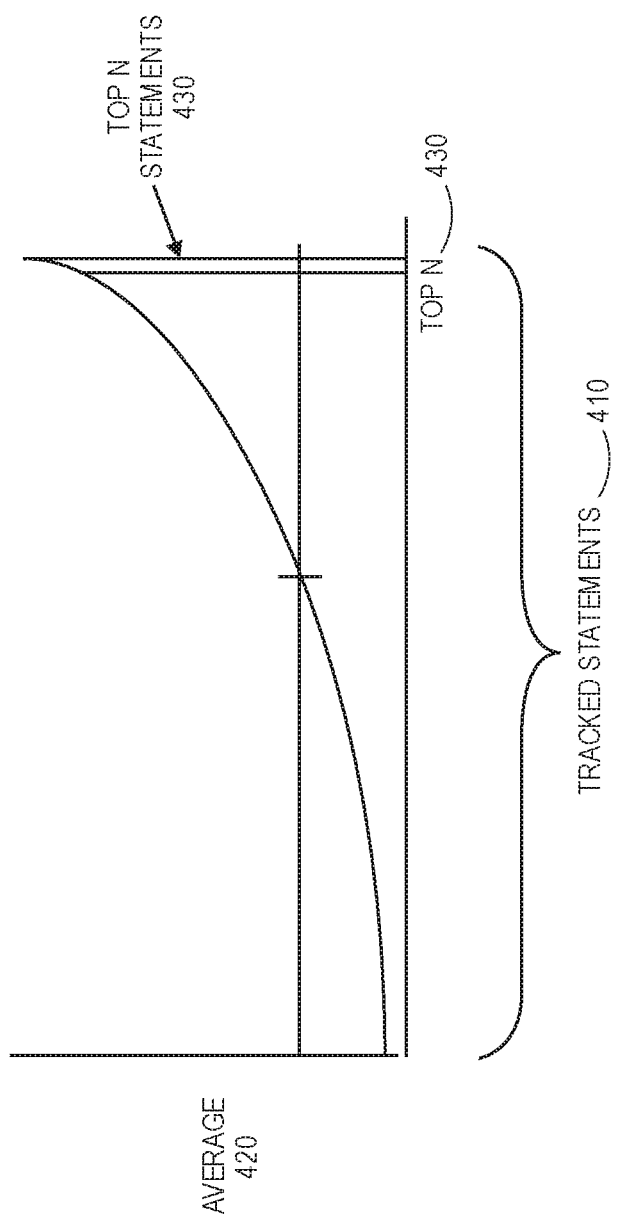
FIG. 4 is an example graphical illustration of a selection of SQL statements based on the statistical filtering as described herein.

FIG. 4 is an example graphical illustration of a selection of SQL statements based on the statistical filtering as described herein. FIG. 4 offers a visual, conceptual illustration of an application of the statistical gathering process described herein. For tracked statements, 410, average 420 is determined and/or applied. Top N statements 430 can be flagged or otherwise designated for analysis. The designation of Top N can be based on number (e.g., top ten statements, top 20 statements, top 100 statements), percentages (e.g., top 1% of statements, top 0.1% of statements, other 5% of statements), a number of standard deviations, other measures, or any combination thereof. This function can be provided, for example, by outlier filter 170 of FIG. 1.

Statistical information can be gathered/measured, for example, statement execution time, resources consumed. Various metrics can be used, added and/or changed.

Figure 5:
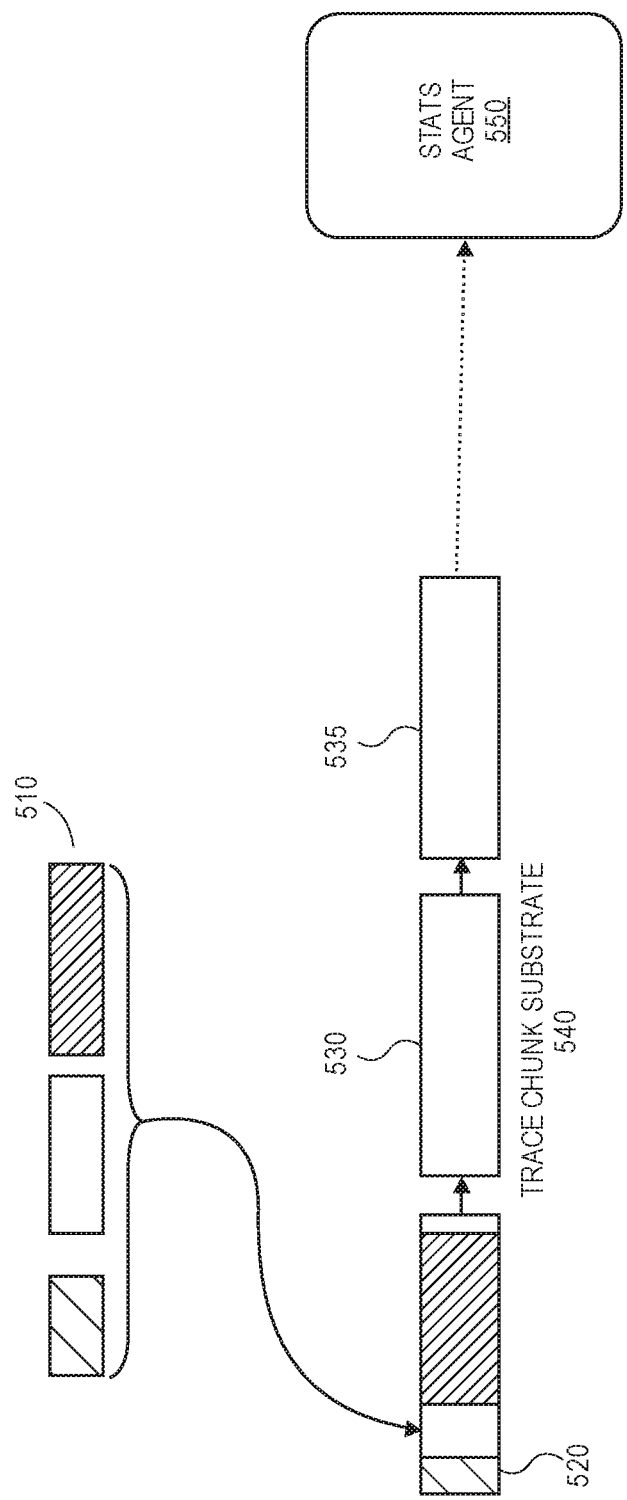
FIG. 5 is a conceptual diagram of a process for collecting per-statement statistics to be provided to a statistics agent.

FIG. 5 is a conceptual diagram of a process for collecting per-statement statistics to be provided to a statistics agent. In the example of FIG. 5, statement 510 (with corresponding contextual information, if any, and/or per-statement statistics), for example, as illustrated and discussed with respect to FIG. 2 can be gathered to be placed in chunk 520. Any number of statements can be supported.

In one embodiment, trace chunk substrate 540 can include any number of chunks (e.g., 520, 530, 535). The chunks are then utilized to provide the statistical information to statistics agent 550. In one embodiment, chunk substrate 540 includes a mechanism for capturing the statistical information in chunks, processing the chunks and reusing the chunks for subsequent statement, for example, as illustrated and discussed with respect to FIG. 1.

Statistics agent 550 provides per-statement statistical functionality as described herein. Statistics agent 550 can be, for example, statistics/analysis agent 160 as illustrated and described with respect to FIG. 1. Use of chunk substrate 540 corresponds to example embodiments in which there exists a separate statistics daemon/agent. For example, if all processes/threads directly update hash tables that are used to track the aggregate statement statistics, the chunks and chunk substrate 540 are not needed (or can be implemented differently). In one embodiment, the key for the hash table is a statement ID. In another embodiment, the key for the hash table is the tenant ID. Use of chunks as described herein can provide a high-speed, low contention stream for processing threads to monitoring frameworks.

Figure 6:
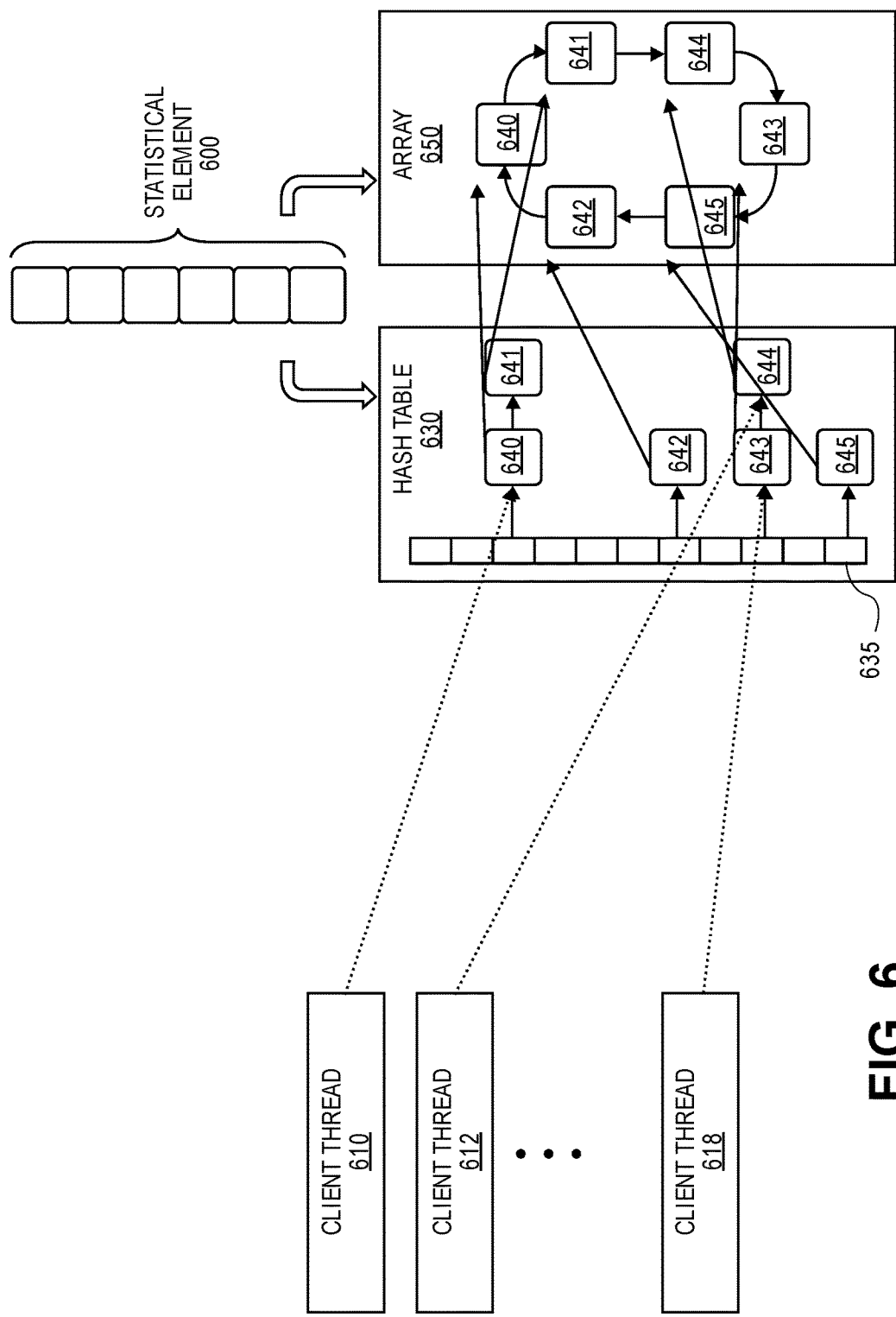
FIG. 6 is a conceptual diagram of a technique for tracking statement and/or tenant statistics in a hash table and an array to collect statistics as described herein.

FIG. 6 is a conceptual diagram of a technique for tracking statement and/or tenant statistics in a hash table and an array to collect statistics as described herein. Client threads (e.g., 610, 612, 618) operate to perform various operations including execution of database statements. The example of FIG. 6 illustrates three clients threads (e.g., 610, 612, 618), which can be threads executed by one or more processors within a computing environment. In one embodiment, the computing environment can be an on-demand services environment, for example, a multitenant computing environment having one or more databases.

In the example of FIG. 6, elements 600 can be utilized to supply both hash table 630 and array 650. In one embodiment, hash table 630 utilizes hash function 635 to map captured statements from the client threads to a corresponding entry (e.g., 640, 641, 642, 643, 644, 645) in hash table 630. In one embodiment, elements are victimized from hash table 630 utilizing array 650. In one embodiment, array 650 is a circular array with corresponding elements (e.g., 640, 641, 642, 643, 644, 645) victimized from hash table 630. In one embodiment, elements 600 is read and sorted without use of a latch to return.

Figure 7:
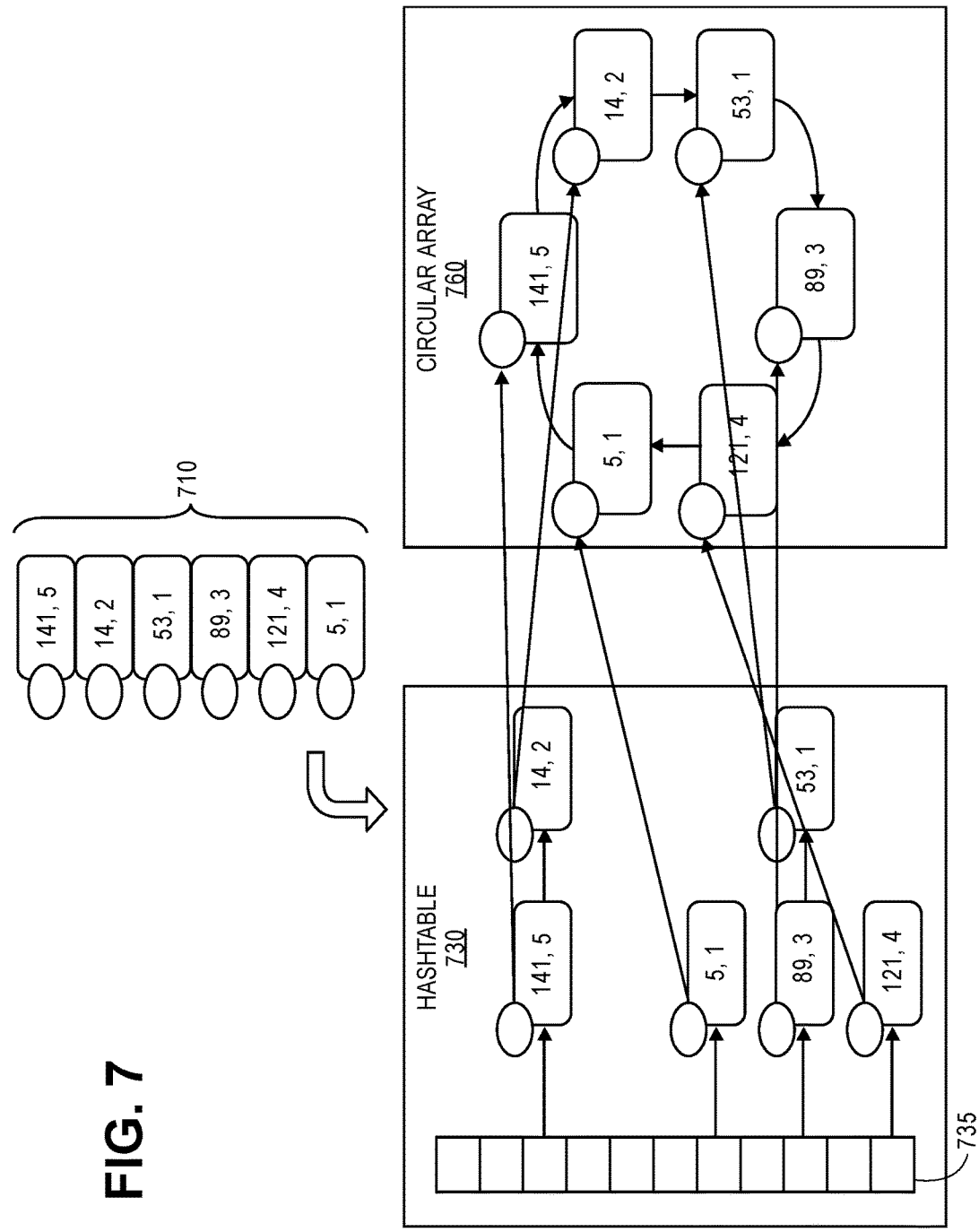
FIG. 7 is a conceptual diagram of a technique for managing elements in a hash table and an array to collect statistics as described herein where the elements include at least a statistical value and a duration value.

FIG. 7 is a conceptual diagram of a technique for managing statistics elements in a hash table and an array to collect statistics as described herein where the statistics elements include at least a statistical value and a duration value. The example of FIG. 7 includes statistics elements from array 710 as they move through hash table 730 and circular array 760.

In the example of FIG. 7, elements (having identifiers and associated statistics) 710 can be utilized to supply both hash table 730 and array 760. In one embodiment, hash table 730 utilizes hash function 735 to map captured statements from the client threads to a corresponding entry in hash table 730. Hashing can be performed based on the statistical value (e.g., "141", "14") stored in the element. In one embodiment, elements are victimized from hash table 730 utilizing array 760. In one embodiment, array 760 is a circular array with elements victimized from hash table 730. In one embodiment, array of chunks 710 is read and sorted without use of a latch to return.

FIG. 8 is a conceptual diagram of a technique for managing elements in a hash table and an array to collect statistics as described herein where statement statistical values are periodically dumped. The example of FIG. 8 includes elements as they move through hash table 830 and circular array 850. Element management can be provided by hash table 830 and array 850 as described above.

In one embodiment, in response to some triggering event (e.g., passage of a preselected period of time, consumption of a set amount of a resource, array size, hash table usage, external event) some portion of the statistics stored in the elements can be dumped (890) to top statement storage 895. This provides the functionality of partially or completely resetting the statistics gathering mechanism.

Thus, the architectures and technique described herein can function to identify and log outlier statements along with all relevant details, for example, to troubleshoot specific statements. In one embodiment, statistics can be captured for each running statement. This can include, for example, a set of counters and gauges per-statement but it can also include things like timed execution plan, hierarchical time spent graphs, etc.

In one embodiment, statistics can be used to decide on whether each thread/process will latch, update the tracking structures and unlatch (which might not scale) or use a separate stats aggregation process/thread. If a separate process/thread is used to update the tracking structures, they may not need to be latched and the design should scale much higher (in terms of the number of statements per second). Either embodiment can be utilized although using a separate process requires a way to communicate a stream of statements to the separate process.

In one embodiment, the tracking structure may be designed for very high throughput (e.g., 1,000,000 statements per second or more). In this embodiment, a single linear array of structures can be utilized: one structure per tracked statement. This would, for example, allocate 1,000,000 structures to track 1,000,000 statements (or tenants, or environments, etc.).

In one embodiment, structures can be simultaneously used as hash table elements as well as array elements in a circular array. The hash table is to find existing statements that are already being tracked. The circular array is to victimize existing statements when space is required.

The following example provides a flow according to one embodiment described herein. A new statement execution completes and it includes statistics as well as any other data to be monitored (e.g. timed execution plan, hierarchical time graph, etc.). In one embodiment, a hash table is used to find the correct structure for that statement ID (or other identifier) if it is already in the hash table. If it is in the hash table, the statement's element has its aggregated stats updated.

If it is not in the hash table, a free element is found which might include victimizing another tracked statement. Victimization uses the circular array form (same structures as the hash elements). In one embodiment, a dual clock hand approach, linear scan and victimize the least important statement, etc. In one embodiment, the system does the following: a current pointer in the circular array is identified and a pre-selected number (e.g., 50, 100) statements are evaluated for victimization. In one embodiment, statistical weight corresponding to statements can be utilized for victimization. In one embodiment, the pre-selected number of statements can be scanned and the lowest weighted statement victimized, where weight is aggregate execution duration. Weight could also be based on processor usage, amount of memory used, or other statistic.

In one embodiment, once a statement structure is victimized, the structure is re-hashed to find the correct hash chain and to find the end of the chain. In one embodiment, this is done so that a victimized structure in the hash chain just walked to find out that the statement was not being tracked. In one embodiment, a large number of statements (e.g. 100,000, 500,000) are tracked and some statements execute frequently. This means that it takes a while for the victimization pointer to wrap around the circular array. For example, victimizations are generally infrequent because tracking so many statements and because the circular array is large and takes lot of victimization to wrap.

In one embodiment, this flow can be latched, executed and unlatched by a processing thread/processes. Or there can have a separate process/thread that specifically performs this flow for all processing threads/processes. In the latter case, a high-speed communication mechanism (many to one) can be used (e.g., the chunk substrate).

In one embodiment, outliers can be identified. In one embodiment, aggregate statistics are tracked for all statements. Either or both of these, outlier statistics can be identified. For example, a statement that executes much slower than normal (e.g., 150 sec. vs. 8 sec.) can be identified. As another example, a statement that used more resources than normal can be identified. Another example, a statement execution that takes longer (e.g., 25×, 200×5×) than normal can be identified. In one embodiment, once an outlier statement is identified, the details about the statement execution can be written directly to a historical statement area (e.g., a log of outlier statements). This would include, for example, the statement text, timed plan, hierarchical time graph, and statistics.

In one embodiment, the system does not investigate the vast majority of these logged statements individually however, analytics can be applied to them to find out why statements are identified as outliers and under which conditions (time of day, always due to extra CPU, certain customers, etc.). Some of the statements will relate to, for example, customer issues and support teams could mine the statement outlier log to find outlier statements for that customer around the time of the reported issue. This will reduce the need to reproduce many types of problems. The support teams, for example, can look at the stats, timed plan, hierarchical time graph, etc.

Figure 9:
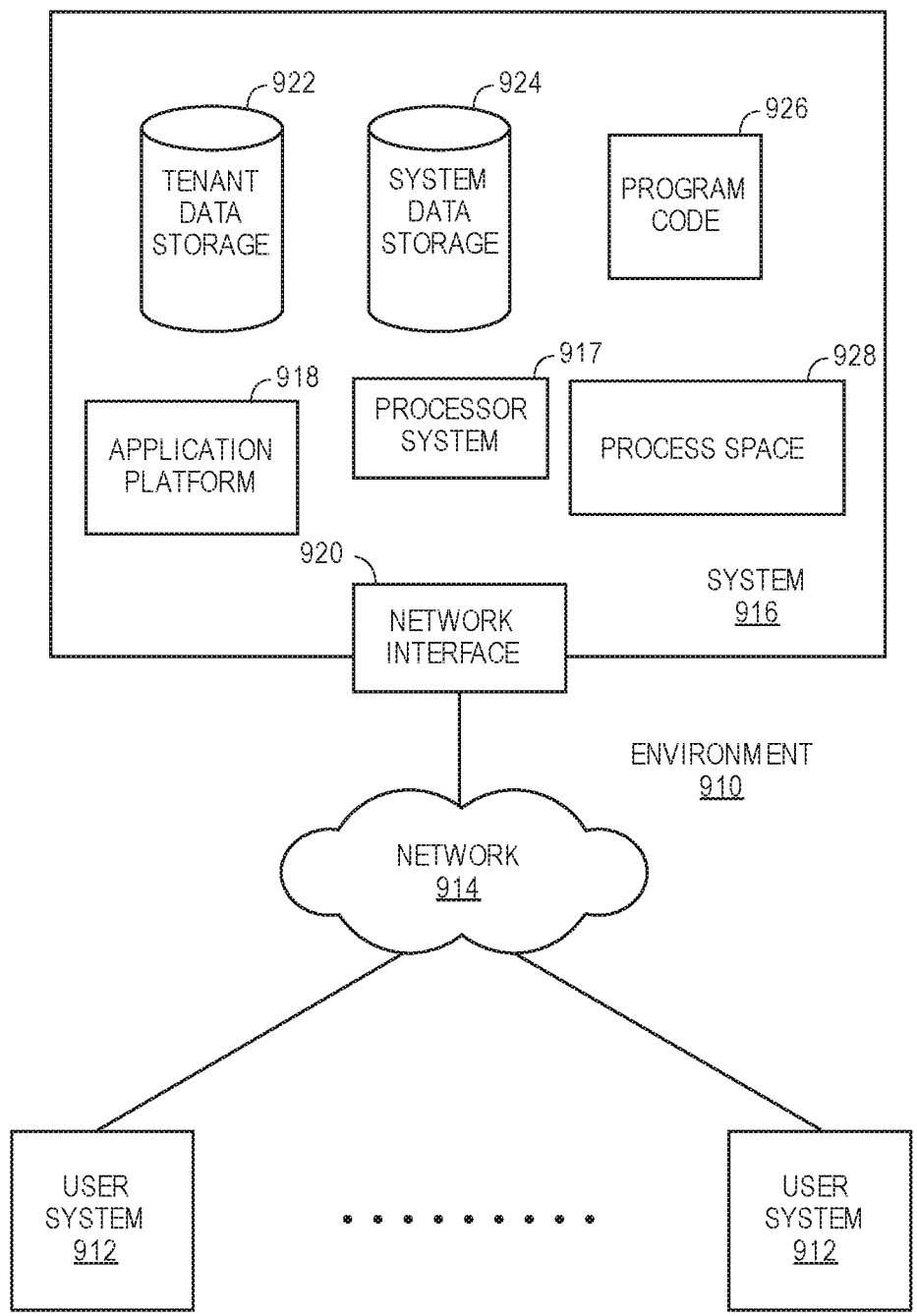
FIG. 9 illustrates a block diagram of an environment wherein an on-demand database service might be used.

FIG. 9 illustrates a block diagram of an environment 910 wherein an on-demand database service might be used. Environment 910 may include user systems 912, network 914, system 916, processor system 917, application platform 918, network interface 920, tenant data storage 922, system data storage 924, program code 926, and process space 928. In other embodiments, environment 910 may not have all of the components listed and/or may have other elements instead of, or in addition to, those listed above.

Environment 910 is an environment in which an on-demand database service exists. User system 912 may be any machine or system that is used by a user to access a database user system. For example, any of user systems 912 can be a handheld computing device, a mobile phone, a laptop computer, a work station, and/or a network of computing devices. As illustrated in herein FIG. 9 (and in more detail in FIG. 10) user systems 912 might interact via a network 914 with an on-demand database service, which is system 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9, implements a web-based customer relationship management (CRM) system. For example, in one embodiment, system 916 includes application servers configured to implement and execute CRM software applications as well as provide related data, code, forms, webpages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third party developer) applications, which may or may not include CRM, may be supported by the application platform 918, which manages creation, storage of the applications into one or more database objects and executing of the applications in a virtual machine in the process space of the system 916.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9 include conventional, well-known elements that are explained only briefly here. For example, each user system 912 could include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 916 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 10:
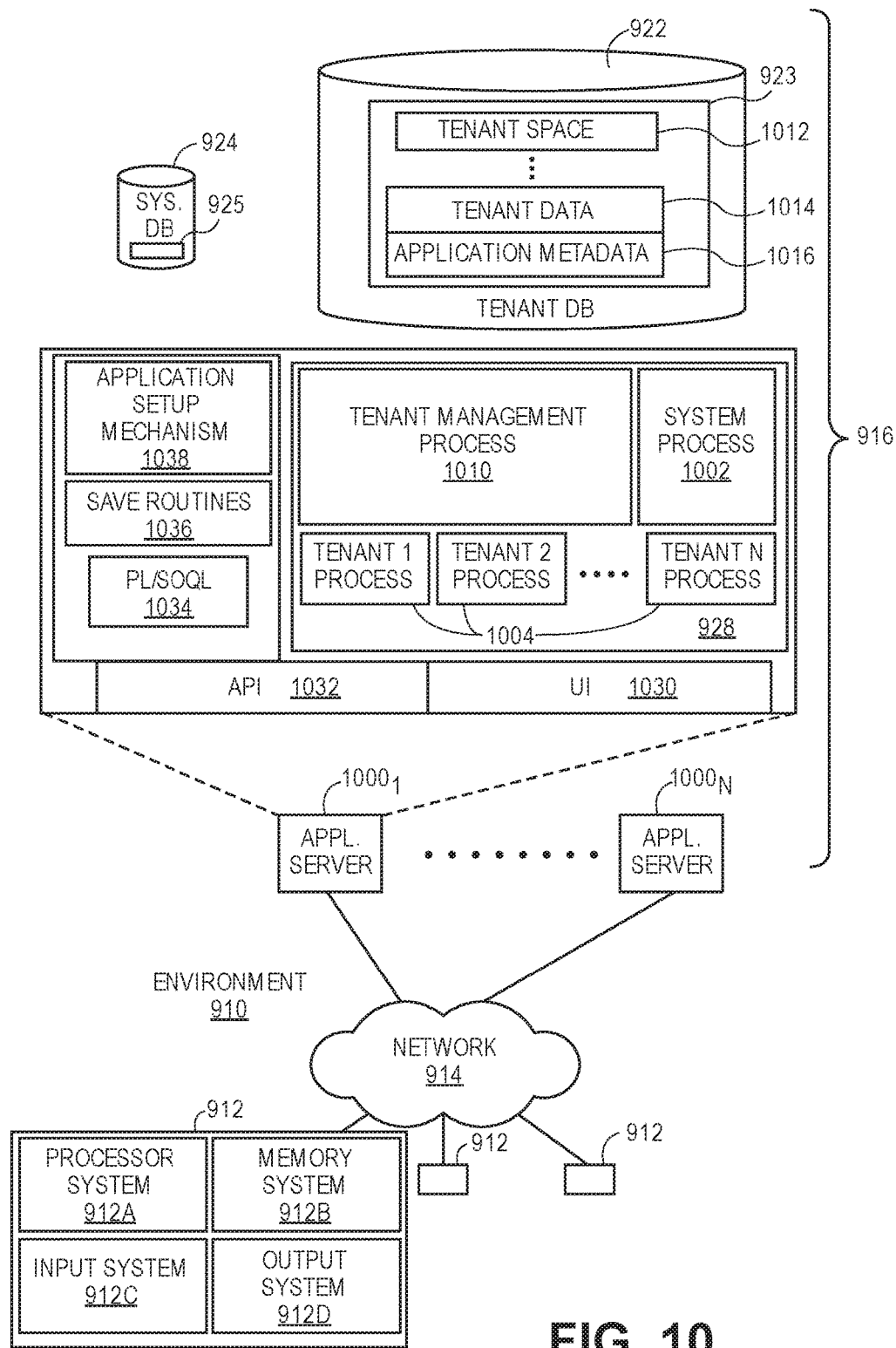
FIG. 10 illustrates a block diagram of an environment wherein an on-demand database service might be used.

FIG. 10 also illustrates environment 910. However, in FIG. 10 elements of system 916 and various interconnections in an embodiment are further illustrated. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers $1000_1$-$400_N$, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of one or more processors. Memory system 912B may be any combination of one or more memory devices, short term, and/or long term memory. Input system 912C may be any combination of input devices, such as one or more keyboards, mice, trackballs, scanners, cameras, and/or interfaces to networks. Output system 912D may be any combination of output devices, such as one or more monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912.

The tenant data and the system data may be stored in various databases, such as one or more Oracle™ databases.

Application platform 918 includes an application setup mechanism 1038 that supports application developers' creation and management of applications, which may be saved as metadata into tenant data storage 922 by save routines 1036 for execution by subscribers as one or more tenant process spaces 1004 managed by tenant management process 1010 for example. Invocations to such applications may be coded using PL/SOQL 1034 that provides a programming language style interface extension to API 1032. A detailed description of some PL/SOQL language embodiments is discussed in commonly owned U.S. Pat. No. 9,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server $1000_1$ might be coupled via the network 914 (e.g., the Internet), another application server $1000_{N-1}$ might be coupled via a direct network link, and another application server $1000_N$ might be coupled by yet a different network connection. Transfer Control Protocol and Internet Protocol (TCP/IP) are typical protocols for communicating between application servers 1000 and the database system. However, it will be apparent to one skilled in the art that other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 Big-IP load balancer) is communicably coupled between the application servers 1000 and the user systems 912 to distribute requests to the application servers 1000. In one embodiment, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., one or more SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system comprising:
one or more hardware processing devices to execute one or more client threads and to execute one or more corresponding processing threads, wherein the processing threads are configurable to generate statistical information for each database query statement processed by the corresponding client thread;
a queue processing agent communicatively coupled with the processing threads to receive the statistical information, to cause the statistical information to be stored in chunks of physical memory managed via a plurality of queues, wherein at least one queue corresponds to a completed queue of chunks and at least one queue corresponds to a processing queue of chunks, and further wherein the queue processing agent maintains at least an in-use list of chunks and at least a free list of chunks wherein the processing threads are further configurable to obtain contextual information corresponding to the database query;
a statistics agent communicatively coupled with the queue processing agent, the statistics agent to analyze the chunks of memory containing the statistics, wherein the statistics agent is configurable to generate and update aggregated statistics based on the contextual information and wherein the contextual information comprises app-specific contextual information, the app-specific contextual information comprises one or more of: a tenant identifier (tenant ID), a user identifier (user ID), and a universal resource identifier (URI);
a filtering agent communicatively coupled with the statistics agent, the filtering agent to filter outlier database query statements based on the statistics and to cause non-outlier database query statements to be stored by a physical storage device;
performing, with the one or more hardware processing devices, additional analysis on the outlier database query statements retrieved from the physical storage device prior to execution.

2. The system of claim 1 wherein the contextual information comprises database contextual information.

3. The system of claim 2 wherein the database contextual information comprises one or more of: a transaction identifier (transaction ID), a statement identifier (statement ID), a statement nest level, a plan identifier (plan ID), and bind variables.

4. The system of claim 1 wherein the database query statements comprise structured query language (SQL)-compliant database query statements.

5. The system of claim 1 wherein the statistical information comprises one or more of: statement execution time, resources consumed.

6. A method for utilizing statistical information in a database environment, the method comprising:
executing one or more client threads with one or more hardware computing devices;
executing, with the one or more hardware computing devices, one or more processing threads corresponding to the one or more client threads, wherein the processing threads are configurable to generate statistical information for each database query statement processed by the corresponding client thread, wherein the processing threads are configurable, with the one or more hardware computing devices, to obtain contextual information corresponding to the database query;
generating, with the one or more hardware computing devices, the statistical information from the processing threads, wherein the one or more hardware computing devices are configurable to generate and update aggregated statistics based on the contextual information and the contextual information comprises app-specific contextual information, wherein the app-specific contextual information comprises one or more of: a tenant identifier (tenant ID), a user identifier (user ID), and a universal resource identifier (URI);
causing, with the one or more hardware computing devices, the statistical information to be stored in chunks of memory managed via a plurality of queues, wherein at least one queue corresponds to a completed queue of chunks and at least one queue corresponds to a processing queue of chunks, and further wherein the queue processing agent maintains at least an in-use list of chunks and at least a free list of chunks;
analyzing the chunks of memory containing the statistics with the one or more hardware computing devices;
filtering, with the one or more hardware computing devices, outlier statements based on the statistics; and
causing, with the one or more hardware computing devices, non-outlier statements to be stored by a physical storage device;
performing, with the one or more hardware processing devices, additional analysis on the outlier database query statements retrieved from the physical storage device prior to execution.

7. The method of claim 6 wherein the database query statements comprise structured query language (SQL)-compliant database query statements.

8. The method of claim 6 wherein the statistical information comprises one or more of: statement execution time, resources consumed.

9. A non-transitory computer-readable medium having stored thereon sequences of instructions for utilizing statistical information in a database environment that, when executed by one or more processors, cause the one or more processors to:
execute one or more client threads;
execute one or more processing threads corresponding to the one or more client threads, wherein the processing threads are configurable to generate statistical information for each database query statement processed by the corresponding client thread, wherein the processing threads are configurable, with the one or more hardware computing devices, to obtain contextual information corresponding to the database query;

generate the statistical information from the processing threads, wherein the one or more hardware computing devices are configurable to generate and update aggregated statistics based on the contextual information and the contextual information comprises app-specific contextual information, wherein the app-specific contextual information comprises one or more of: a tenant identifier (tenant ID), a user identifier (user ID), and a universal resource identifier (URI);

cause the statistical information to be stored in chunks of memory managed via a plurality of queues, wherein at least one queue corresponds to a completed queue of chunks and at least one queue corresponds to a processing queue of chunks, and further wherein the queue processing agent maintains at least an in-use list of chunks and at least a free list of chunks;

analyze the chunks of memory containing the statistics;

filter outlier statements based on the statistics; and cause non-outlier statements to be stored by a physical storage device;

performing, with the one or more hardware processing devices, additional analysis on the outlier database query statements retrieved from the physical storage device prior to execution.

10. The non-transitory computer-readable medium of claim 9 wherein the database query statements comprise structured query language (SQL)-compliant database query statements.

11. The non-transitory computer-readable medium of claim 9 wherein the statistical information comprises one or more of: statement execution time, resources consumed.

12. A system comprising:

one or more hardware processing devices to execute one or more client threads and to execute one or more corresponding processing threads, wherein the processing threads are configurable to generate statistical information for each database query statement processed by the corresponding client thread;

a queue processing agent communicatively coupled with the processing threads to receive the statistical information, to cause the statistical information to be stored in chunks of physical memory managed via a plurality of queues, wherein at least one queue corresponds to a completed queue of chunks and at least one queue corresponds to a processing queue of chunks, and further wherein the queue processing agent maintains at least an in-use list of chunks and at least a free list of chunks wherein the processing threads are further configurable to obtain contextual information corresponding to the database query;

a statistics agent communicatively coupled with the queue processing agent, the statistics agent to analyze the chunks of memory containing the statistics, wherein the statistics agent is configurable to generate and update aggregated statistics based on the contextual information and wherein the contextual information comprises database contextual information, the database contextual information comprises one or more of: a transaction identifier (transaction ID), a statement identifier (statement ID), a statement nest level, a plan identifier (plan ID), and bind variables;

a filtering agent communicatively coupled with the statistics agent, the filtering agent to filter outlier database query statements based on the statistics and to cause non-outlier database query statements to be stored by a physical storage device;

performing, with the one or more hardware processing devices, additional analysis on the outlier database query statements retrieved from the physical storage device prior to execution.

13. The system of claim 12 wherein the database query statements comprise structured query language (SQL)-compliant database query statements.

14. The system of claim 12 wherein the statistical information comprises one or more of: statement execution time, resources consumed.

15. A method for utilizing statistical information in a database environment, the method comprising:

executing one or more client threads with one or more hardware computing devices;

executing, with the one or more hardware computing devices, one or more processing threads corresponding to the one or more client threads, wherein the processing threads are configurable to generate statistical information for each database query statement processed by the corresponding client thread, wherein the processing threads are configurable, with the one or more hardware computing devices, to obtain contextual information corresponding to the database query;

generating, with the one or more hardware computing devices, the statistical information from the processing threads, wherein the one or more hardware computing devices are configurable to generate and update aggregated statistics based on the contextual information and the contextual information comprises database contextual information, wherein the database contextual information comprises one or more of: a transaction identifier (transaction ID), a statement identifier (statement ID), a statement nest level, a plan identifier (plan ID), and bind variables;

causing, with the one or more hardware computing devices, the statistical information to be stored in chunks of memory managed via a plurality of queues, wherein at least one queue corresponds to a completed queue of chunks and at least one queue corresponds to a processing queue of chunks, and further wherein the queue processing agent maintains at least an in-use list of chunks and at least a free list of chunks;

analyzing the chunks of memory containing the statistics with the one or more hardware computing devices;

filtering, with the one or more hardware computing devices, outlier statements based on the statistics; and causing, with the one or more hardware computing devices, non-outlier statements to be stored by a physical storage device;

performing, with the one or more hardware processing devices, additional analysis on the outlier database query statements retrieved from the physical storage device prior to execution.

16. The method of claim 15 wherein the database query statements comprise structured query language (SQL)-compliant database query statements.

17. The method of claim 15 wherein the statistical information comprises one or more of: statement execution time, resources consumed.

18. A non-transitory computer-readable medium having stored thereon sequences of instructions for utilizing statistical information in a database environment that, when executed by one or more processors, cause the one or more processors to:

execute one or more client threads;

execute one or more processing threads corresponding to the one or more client threads, wherein the processing threads are configurable to generate statistical information for each database query statement processed by the corresponding client thread, wherein the processing threads are configurable, with the one or more hardware computing devices, to obtain contextual information corresponding to the database query;

generate the statistical information from the processing threads, wherein the one or more hardware computing devices are configurable to generate and update aggregated statistics based on the contextual information and the contextual information comprises database contextual information, wherein the database contextual information comprises one or more of: a transaction identifier (transaction ID), a statement identifier (statement ID), a statement nest level, a plan identifier (plan ID), and bind variables;

cause the statistical information to be stored in chunks of memory managed via a plurality of queues, wherein at least one queue corresponds to a completed queue of chunks and at least one queue corresponds to a processing queue of chunks, and further wherein the queue processing agent maintains at least an in-use list of chunks and at least a free list of chunks;

analyze the chunks of memory containing the statistics;

filter outlier statements based on the statistics; and cause non-outlier statements to be stored by a physical storage device;

performing, with the one or more hardware processing devices, additional analysis on the outlier database query statements retrieved from the physical storage device prior to execution.

19. The non-transitory computer-readable medium of claim 18 wherein the database query statements comprise structured query language (SQL)-compliant database query statements.

20. The non-transitory computer-readable medium of claim 18 wherein the statistical information comprises one or more of: statement execution time, resources consumed.

* * * * *